US008050336B2

(12) United States Patent
Bocquet

(10) Patent No.: US 8,050,336 B2
(45) Date of Patent: Nov. 1, 2011

(54) FREQUENCY DOMAIN EQUALIZATION METHOD AND APPARATUS FOR A SINGLE CARRIER RECEIVER

(75) Inventor: Wladimir Bocquet, Koutou (JP)

(73) Assignee: Fujitsu Limited, Kawasaki (JP)

( * ) Notice: Subject to any disclaimer, the term of this patent is extended or adjusted under 35 U.S.C. 154(b) by 917 days.

(21) Appl. No.: 11/645,085

(22) Filed: Dec. 22, 2006

(65) Prior Publication Data

US 2007/0147529 A1 Jun. 28, 2007

Related U.S. Application Data

(63) Continuation of application No. PCT/JP2004/010186, filed on Jul. 16, 2004.

(51) Int. Cl.
*H04K 1/10* (2006.01)
*H03K 5/159* (2006.01)
*H04J 11/00* (2006.01)

(52) U.S. Cl. .................. 375/260; 375/233; 370/210

(58) Field of Classification Search .................. 375/233, 375/260; 370/210
See application file for complete search history.

(56) References Cited

U.S. PATENT DOCUMENTS

| | | | | |
|---|---|---|---|---|
| 5,886,749 | A * | 3/1999 | Williams et al. | 348/614 |
| 5,914,987 | A | 6/1999 | Fogel | |
| 5,999,561 | A * | 12/1999 | Naden et al. | 375/142 |
| 6,252,914 | B1 | 6/2001 | Yamamoto | |
| 6,507,585 | B1 | 1/2003 | Dobson | |
| 7,212,569 | B1 * | 5/2007 | Clark | 375/233 |
| 2002/0037058 | A1 | 3/2002 | Birru | |
| 2002/0118765 | A1 * | 8/2002 | Nangia et al. | 375/260 |
| 2004/0013084 | A1 * | 1/2004 | Thomas et al. | 370/210 |
| 2004/0076230 | A1 * | 4/2004 | Tomono | 375/240.01 |
| 2005/0122947 | A1 * | 6/2005 | Wang et al. | 370/342 |

FOREIGN PATENT DOCUMENTS

| | | |
|---|---|---|
| EP | 0 652 663 | 5/1995 |
| JP | 10-191104 | 7/1998 |
| JP | 2000-040987 | 2/2000 |
| JP | 2000-156655 | 6/2000 |
| JP | 2003-51802 | 2/2003 |
| WO | WO 02/05505 | 1/2002 |

OTHER PUBLICATIONS

Supplementary European Search Report dated Jul. 18, 2011, from corresponding European Application No. 04 74 7652.
Pawel A. Dmochowski, et al. "Frequency Domain Equalization for High Data Rate Multipath Channels" IEEE Pacific RIM Conference on Communications, Computers and Signal Processing, vol. 2, Aug. 26, 2001, pp. 534-537.
David D. Falconer, et al "Broadband Wireless Using Single Carrier and Frequency Domain Equalization" Wireless Personal Multimedia Communications, vol. 1, Oct. 27, 2002, pp. 27-36.
International Search Report dated Oct. 19, 2004.
H. Sari, et al. "Frequency-Domain Equalization of Mobile Radio and Terrestrial Broadcast Channels" Proc. Globecom, 1994, pp. 1-5.

* cited by examiner

*Primary Examiner* — David C. Payne
*Assistant Examiner* — Sarah Hassan
(74) *Attorney, Agent, or Firm* — Katten Muchin Rosenman LLP

(57) ABSTRACT

A frequency-domain-equalization apparatus for a receiver in single-carrier communication comprising: a selection means (103) for selecting a time-sequence-signal portion from a received signal that is longer than one block; a Fourier-transformation means (104) for performing Fourier transformation of the time-sequence-signal portion that is longer than one block and converting the signal to a frequency-domain signal; a channel-compensation means (105 to 106) for estimating the channels in the frequency domain and performing channel compensation, and a selection means (107, 108; 151) for performing inverse-Fourier transformation of the channel-compensated signal and selecting a one-block time-sequence-signal portion from the inverse Fourier-transformation results.

15 Claims, 11 Drawing Sheets

FIG. 7
(A) 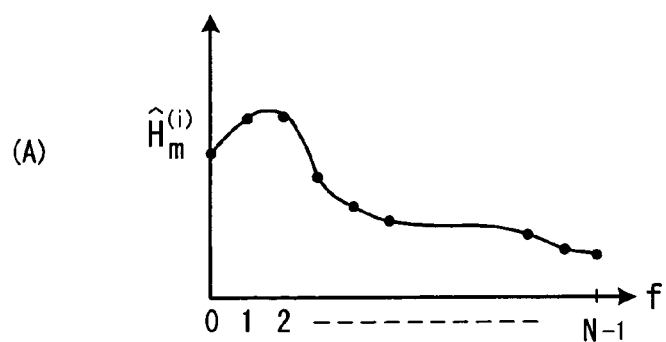
(B) 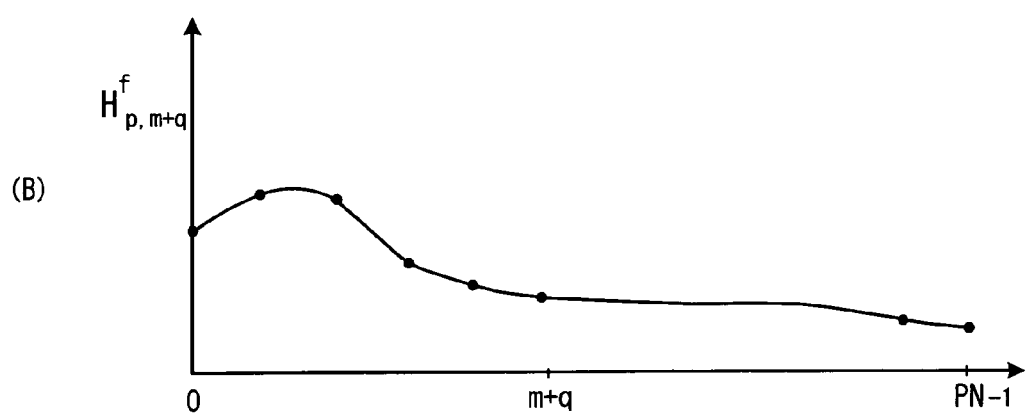

US 8,050,336 B2

FREQUENCY DOMAIN EQUALIZATION METHOD AND APPARATUS FOR A SINGLE CARRIER RECEIVER

This application is a continuation of International Application PCT/JP2004/010186, filed on Jul. 16, 2004, the contents of which are herein wholly incorporated by reference.

BACKGROUND OF THE INVENTION

The present invention relates to a frequency-domain-equalization method and apparatus for a single-carrier receiver, and more particularly, to a frequency-domain-equalization method and apparatus for a receiver in a single-carrier-transmission system that compensates for inter-symbol interference.

A single-carrier (SC: Single Carrier) transmission system is a transmission method that has been used for a long time (see H. Sari, G. Karam and I. Jeanclaude, "Frequency-Domain Equalization of Mobile Radio and Terrestrial Broadcast Channels", Proc. Globecom 1994, San Francisco, Nov.-Dec. 1994, pp. 1-5), and with this system, data symbols are transmitted as a fixed-symbol-rate serial stream having a pulse for which the amplitude and/or phase has been modulated. A linear-frequency-domain equalizer (FDE: Frequency domain equalizer) performs reception filtering in the frequency domain in order to minimize the inter-symbol interference. That function is the same as that of a time-domain equalizer. However, from the viewpoint of difficulty in calculation, using a linear-frequency-domain equalizer that performs equalization for each data block is easier for a channel having a severe delay spread. In other words, since a linear-frequency-domain equalizer performs processing for each block, the computation load in a poor transmission path environment is less than in the case of a time-domain equalizer. In order for a frequency-domain equalizer, which performs Fourier transformation and inverse Fourier transformation, to operate with sufficient performance, there must be a guard interval between each data block. However, in a multi-path propagation environment having a delay time that is longer than the guard interval, it is not possible to remove all of the inter-symbol interference, and the transmission characteristics become poor.

FIG. 9 is a block diagram of a single-carrier-transmission system. In a single-carrier transmitter 10, a channel encoder (encoding unit) 11 encodes the data and pilots using convolution code or turbo code, for example, and a modulation unit 12 modulates the encoded data using QPSK and forms a block having a length of N modulated symbols. As shown in FIG. 10, a guard-interval-insertion unit 13 copies the end portion of the N-symbol transmission block onto the starting portion of each block as a cyclic prefix (guard interval). A digital-to-analog converter 14 converts the signal that is output from the guard-interval-insertion unit 13 to an analog signal, a radio-transmitting unit 15 performs up-conversion of the baseband signal to a radio frequency, and then amplifies the signal and transmits it from an antenna ATS. The signal that is transmitted from the antenna ATS is propagated along a multi-path propagation path (multi-path fading channel) 20 and received by a single-carrier receiver 30.

The length of the cyclic prefix that is inserted by the guard-interval-insertion unit 13 must be longer than the maximum delay spread so that no inter-symbol interference (ISI) is received. The cyclic prefix that is placed at the start of each block has mainly: (1) a function for removing distortion that is caused by inter-symbol interference from the previous block, and (2) a function for making it possible to see or detect the received block in cycle N.

In a single-carrier receiver 30, a radio-receiving unit 31 filters the signal that is received from the antenna ATR, and together with removing the unneeded frequency component, converts the frequency of the radio signal to a baseband frequency, an analog-to-digital converter 32 converts that baseband signal to a digital signal, and a guard-interval-removal unit 33 removes the guard intervals and inputs the signal to an S/P conversion unit 34 that constitutes a single-carrier frequency-domain equalizer (SC-FDE). The single-carrier frequency-domain equalizer comprises an S/P conversion unit 34, Fourier-transformation unit 35, channel-estimation unit 36, channel-compensation unit 37, inverse-Fourier-transformation unit 38 and P/S conversion unit 39.

The S/P conversion unit 34 converts N number of time-sequence data from which the guard interval has been removed into parallel data, and inputs the result into an N-point Fourier-transformation unit (DFT or FFT, it will be the same below) 35. The N-point Fourier-transformation unit 35 performs N-point Fourier transformation of the N number of time-sequence data, and outputs N number of sub-carrier components. The channel-estimation unit 36 uses the pilot symbols that are periodically sent, and by a well-known method estimates the channel characteristics of the N number of sub-carriers, then the channel-compensation unit 37 multiplies the N number of sub-carrier components that were output from the Fourier-transformation unit 35 by channel-compensation coefficients to perform channel compensation. The N-point inverse-Fourier-transformation unit (IDFT or IFFT, it will be the same below) 38 performs N-point inverse-Fourier transformation of the N number of channel-compensated sub-carrier data, and outputs N number of time-sequence data, then the P/S conversion unit 39 converts the N number of time-sequence data in order to serial data and outputs the result. A demodulation unit 40 performs QPSK demodulation of the signal for which frequency-domain equalization has been performed, and a decoding unit 41 decodes the encoded data and outputs the decoded received data.

FIG. 11 is a block diagram of a single-carrier CDMA transmission system. In a single-carrier CDMA transmitter 50, channel encoders for each user (encoder units) $51_1$ to $51_j$ encode transmission data using convolution code or turbo code, for example, and modulation units $52_1$ to $52_j$ modulate the encoded data using QPSK, for example. Spreading units $53_1$ to $53_j$ multiply and spread the data sequence that is output from the modulation units by multiplying the data sequence with spreading code that is orthogonal for each user, and a combining unit 54 combines the spread data that is output from each spreading unit. When the spreading factor is taken to be SF, the spreading code is a code string comprising SF number of chips.

FIG. 12 is a drawing explaining the data format. One frame comprises Nfi number of data, where Np number of pilot data are time multiplexed in front of Nd number of user data, so that Nfi=Nd+Np. Each of the data is multiplied by SF number of spreading codes, so that (Nd+Np)×SF number of multiplication results are output from the spreading units per frame, and then combined by the combining unit 54. The pilot data are used by the receiving side for channel estimation. The baseband transmission signal of the kth user can be expressed as shown below.

$$s_k(t) = \sum_{i=0}^{Nd+Np-1} \sum_{m=0}^{SF} d_k(t - iT_s) \cdot c_k(t - mT_c) \quad (1)$$

Here, dk(t), ck(t), Ts and Tc represent the modulation signal, spreading-code sequence, symbol period and chip period, respectively.

As shown in FIG. 12, in order to obtain a transmission signal that is free of ISI, a guard-interval-insertion unit 55 inserts G number of guard intervals into N number of data for each multiplication result, to form one transmission symbol. Here, N is the FFT size of the frequency-domain equalizer (FDE) on the receiving side. By taking 'q' to be the number of transmission symbols for each frame results in the following equation.

(Np+Nd)×SF/N=q

Depending on the guard-interval configuration of either a cyclic prefix or zero insertion, the transmission-symbol indirect wave for which the delay time is less than the guard interval does not distort other transmission symbols.

A digital-to-analog converter (D/A) 56 converts the signal that is output from the guard-interval-insertion unit 55 to an analog signal, and a radio-transmission unit 57 performs up-conversion of the baseband signal to a radio frequency, then amplifies the signal and transmits it from an antenna ATS. The signal that is transmitted from the antenna ATS propagates over a multi-path propagation path (multi-path fading channel) 60, and it is received by a single-carrier CDMA receiver 70.

By taking the channel-path response of the kth user to be $h_k(\tau; t)$, the received signal becomes as the following.

$$r(t) = h_k(\tau; t) \otimes \sum_{k=0}^{K-1} s_k(t - \tau_k) + n(t) \quad (2)$$

Here, $\tau_k$ is the propagation delay of the kth user, K is the number of users, n(t) is AWGN, and ⊗ is the convolution integral.

In the single-carrier CDMA receiver 70, a radio-reception unit 71 filters the signal that was received from the antenna ATR, and together with removing the unneeded frequency component, converts the radio signal to a baseband frequency, and an analog-to-digital converter 72 converts the baseband signal to a digital signal, a guard-interval-removal unit 73 removes the guard intervals and inputs the result to the S/P conversion unit 74 that constitutes a single-carrier-frequency-domain equalizer (SC-FDE). The single-carrier-frequency-domain equalizer (SC-FDE) comprises a S/P conversion unit 74, Fourier-transformation unit 75, channel-estimation unit 76, channel-compensation unit 77, inverse-Fourier-transformation unit 78 and P/S conversion unit 79.

The S/P conversion unit 74 converts the N number of time-sequence data from which the guard interval have been removed to parallel data, and inputs the result to an N-point Fourier-transformation unit 75. The N-point Fourier-transformation unit 75 performs N-point Fourier transformation of the N number of time-sequence data, and outputs N number of sub-carrier components. The channel-estimation unit 76 estimates the channel characteristics of the N number of sub carriers by a well-known method of using the transmission symbols of the pilots that are periodically sent, and the channel-compensation unit 77 multiplies the N number of sub-carrier components that are output from the Fourier-transformation unit by channel-compensation coefficients to perform channel compensation. The N-point inverse-Fourier-transformation unit 78 performs N-point inverse-Fourier transformation of the N number of the channel-compensated sub-carrier data and outputs N number of time-sequence data, and the P/S conversion unit 79 converts the N number of time-sequence data in order to serial data, and outputs the result. An inverse-spreading unit 80 multiplies the serially input data by inverse-spreading code (same code as the spreading code) to perform inverse spreading, a demodulation unit 81 performs QPSK demodulation of the signal for which frequency-domain equalization and inverse spreading has been performed, and a decoding unit 82 decodes the demodulated data, and outputs the decoded received data.

As described above, in the single-carrier CDMA receiver, after the guard intervals have been removed, N-point Fourier transformation is employed, and channel distortion is compensated using prior technology such as the ZF method or MMSE method in the frequency domain. After channel distortion in both the amplitude and phase has been compensated, N-point inverse-Fourier transformation is employed. Next, the data is multiplied by inverse-spreading code, and finally the symbols are demodulated and decoded.

The SC-FDE transmission method is robust technology for multi-path and channel distortion. However, since guard intervals lower the transmission efficiency, it cannot be performed for a long time. Therefore, in several cases the guard-interval length becomes shorter than the maximum propagation delay, and in that case, the guard intervals become ineffective against inter-symbol interference (ISI).

A receiving method has been proposed that uses both a frequency-domain equalizer (FDE) and time-domain equalizer (FDE) with the purpose of obtaining good reception characteristics even in environments where there is multi-fading disturbance such as in a mobile receiving environment (refer to JP 2003-51802 A).

Moreover, the inventors of this invention have also proposed a receiving method and receiver for an OFDM receiver or OFDM-CDMA receiver that are more effective against propagation delay longer than guard intervals (refer to JP 15-998924 A).

The receiving method disclosed in patent document 1 performs time-domain equalization after performing frequency-domain equalization, after which it performs Fourier transformation and demodulation. However, this receiving method is less effective against propagation delay which is longer than guard intervals.

The receiving method disclosed in patent document 2 is more effective against propagation delay which is longer than guard intervals, however, it is for use in OFDM communication or OFDM-OCDMA communication, and can not be applied for use in single-carrier communication.

SUMMARY OF THE INVENTION

Taking the above problems into consideration, it is the object of this invention to prevent receiving effects of inter-symbol interference in single-carrier communications even when propagation delay that is longer than guard interval occurs.

Another object of the present invention is to prevent receiving effects of inter-symbol interference without inserting guard intervals even when large propagation delay occurs.

The present invention accomplishes the objectives described above by a frequency-domain-equalization method for a receiver in single-carrier communication. This frequency-domain-equalization method comprises a first step of selecting a time-sequence-signal portion that is longer than one block from a received signal; a second step of performing Fourier transformation of the time-sequence-signal portion and converting it to a frequency-domain signal; a third step of performing channel compensation in the frequency domain; and a fourth step of performing inverse-Fourier transformation of the channel-compensated signal, then selecting and outputting a one-block time-sequence signal portion from the inverse-Fourier-transformation results.

The first step selects a time-sequence-signal portion from a received signal that is P times the length N of the signal portion of one block, and inputs that portion to a P·N-point Fourier-transformation unit; the second step performs P·N-point Fourier transformation of said time-sequence-signal portion consisted of P·N number of data; and step 4 performs the inverse-Fourier transformation, and selects a one-block time-sequence-signal portion from the inverse-Fourier-transformation results by performing calculation that converts a P·N-dimensional signal in the frequency domain to a N-dimensional signal in the time domain.

Also, the present invention accomplishes the objectives described above by a frequency-domain-equalization apparatus for a receiver in single-carrier communication. A first frequency-domain-equalization apparatus comprises: a first selection unit that selects a time-sequence signal portion that is longer than one block from a received signal; a Fourier-transformation unit that performs Fourier transformation of that time-sequence signal portion that is longer than one block and converts it to a frequency-domain signal; a channel-compensation unit that estimates channels in the frequency domain and performs channel compensation; an inverse-Fourier-transformation unit that performs inverse Fourier transformation of the channel-compensated signal; and a second selection unit that selects a one-block time-sequence signal portion from the inverse Fourier transformation results.

A second frequency-domain-equalization apparatus comprises: a first selection unit that selects a time-sequence signal portion that is longer than one block from a received signal; a Fourier-transformation unit that performs Fourier transformation of that time-sequence signal portion that is longer than one block and converts it to a frequency-domain signal; a channel-compensation unit that estimates channels in the frequency domain and performs channel compensation; and a computation unit that performs inverse Fourier transformation of the channel-compensated signal and outputs a one-block time-sequence signal portion.

According to this invention, time-sequence-signal portions that are longer than one block such as time-sequence-signal portions that are P times longer than the length N of the signal portion of one block are selected from a received signal in order having a phase difference of N, then P·N-point Fourier transformation is performed on the P·N signal portion, after which channel compensation is performed in the frequency domain, P·N-point inverse-Fourier transformation is performed on the channel-compensated signals and one-block time-sequence-signal portion is selected and output from the inverse-Fourier-transformation results, so this invention makes it possible to not receive the effect of inter-symbol interference in single-carrier communication even when propagation delay that is longer than a guard interval occurs.

Also, this invention makes it possible to not receive the effect of inter-symbol interference even when no guard intervals are inserted and large propagation delay occurs.

Moreover, according to this invention inverse-Fourier transformation is performed on P·N number of channel-compensated signals and one-block time-sequence-signal portions (=N) are selected and output from the inverse-Fourier-transformation results by a single computation means in a single process so it is possible to reduce the processing time.

BRIEF DESCRIPTION OF THE DRAWINGS

FIG. 7 is a drawing explaining the operation of the channel-estimation unit.

DESCRIPTION OF THE PREFERRED EMBODIMENTS (A) First Embodiment (a) Principles of the Invention FIG. 1 is a drawing explaining the principles of the present invention. As shown in (A) of FIG. 1, two paths, one for a direct wave comprising transmission symbols A, B, C, . . . , and one for a delay wave having delay time τ are considered. When there is delay time τ, the front portion of transmission symbol A of the direct wave overlaps the rear portion of transmission symbol X of the delay wave, and inter-symbol interference is received. Similarly, the front portion of transmission symbol B of the direct wave overlaps the rear portion of transmission symbol A of the delay wave and inter-symbol interference is received. However, since the rear portion of transmission symbol A of the direct wave overlaps the front portion of transmission symbol A of the delay signal, inter-symbol interference is not received. Moreover, since the rear portion of transmission signal B of the direct wave overlaps the front portion of transmission symbol B of the delay wave, inter-symbol interference is not received. In other words, when there is delay time between the direct wave and delay wave, there are periods of interference and periods of no interference.

Figure 1:
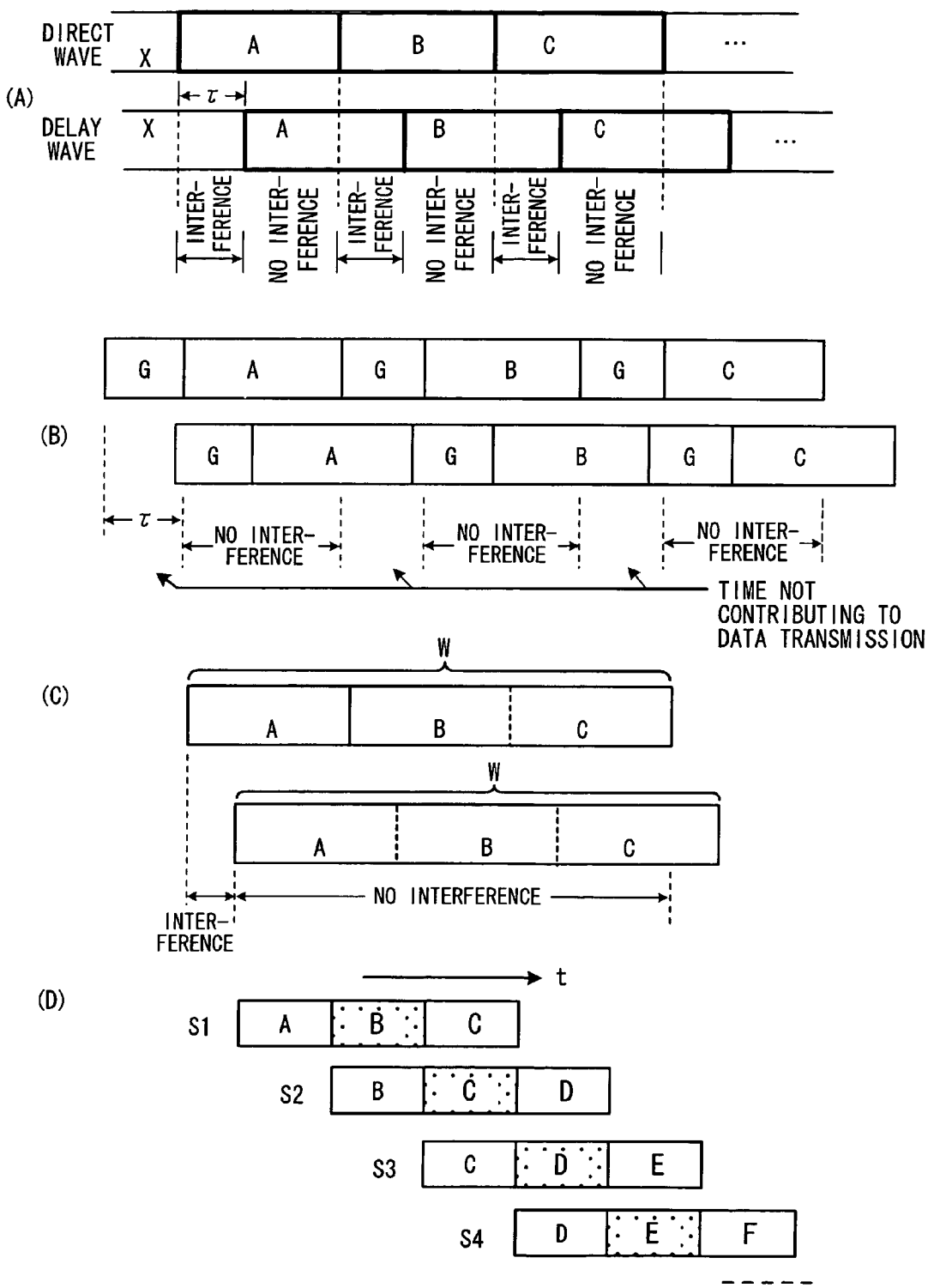
FIG. 1 is a drawing explaining the principles of the present invention.

In the prior method, in order to eliminate the periods of interference, guard intervals G were inserted as shown in (B) of FIG. 1. Normally, the guard intervals are set so they are longer than the maximum delay time, so there is a disadvantage in that when there is a guard interval whose length cannot be ignored with respect to the symbol lengths, the transmission efficiency becomes extremely poor. Therefore, instead of inserting guard intervals, by making the transmission-symbol length W 3 times that of the original transmission-symbol length N as shown in (C) of FIG. 1, it is possible to reduce the ratio of periods of interference when compared with that shown in (A) of FIG. 1, or in other words, the effect of inter-symbol interference becomes small and transmission characteristics are improved. Ideally, by making the transmission-symbol length infinitely large, it is possible to reduce the ratio of the periods of interference, as a result they can be ignored. This method is actually effective regardless of whether or not there are guard intervals, and therefore it is even effective for signals in which there are guard intervals.

As described above, by extracting the original transmission symbol length N (for example B) from the enlarged symbol length W, it is possible to perform frequency-domain equalization having little effect of inter-symbol interference.

Therefore, as shown in (D) of FIG. 1, in a frequency-domain equalizer of a single-carrier receiver, control is performed so that frequency-domain equalization is performed for three transmission symbols (S1→S2→S3→S4→...) at a time for which the phase difference N is continuous, and the middle N number of data are extracted from the processing results. By doing this, it is possible to perform frequency-domain equalization having little effect of inter-symbol interference.

Also, as can be clearly seen from the explanation above, it is not always necessary to insert guard intervals. When guard intervals are inserted, frequency-domain equalization is performed without deleting the guard intervals in the receiver.

When the transmission-symbol length is P times the original transmission-symbol length N, this method works best the larger P is, however, the amount of signal processing also increases, so this method is limited by how much P can be increased.

Figure 2:
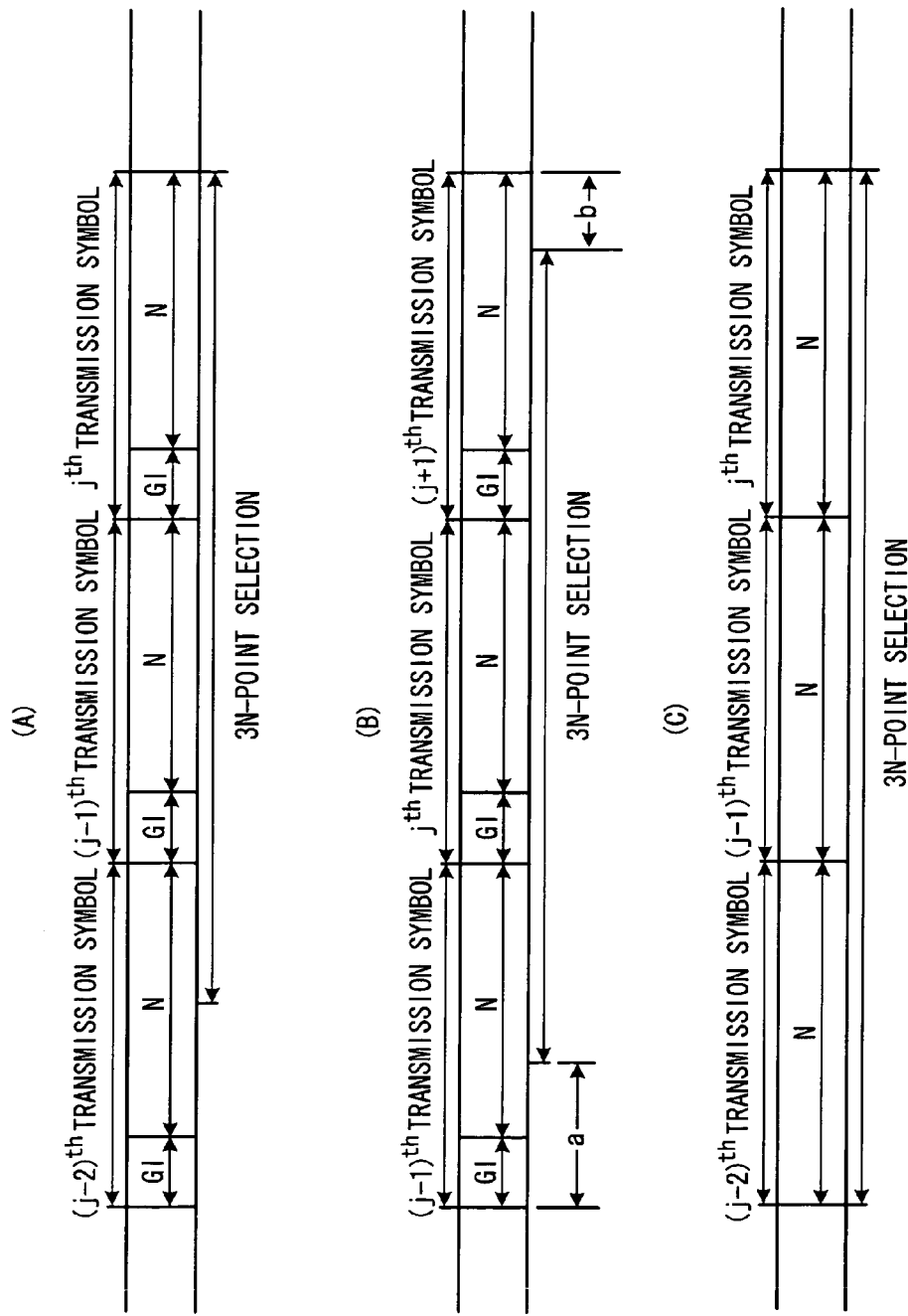
FIG. 2 is a drawing explaining cluster selection when P=3.

FIG. 2 is a drawing explaining cluster selection for the case when P=3, where (A) and (B) of FIG. 2 show the case when guard intervals are included in the received signal, and (C) of FIG. 2 shows the case when guard intervals are not included.

In (A) of FIG. 2 shown is the case in which 3×N-point data are selected starting from the end portion of the third transmission symbol of three transmission symbols, in (B) of FIG. 2 shown is the case in which 3×N-point data are selected so that transmission symbols a and b on both sides become equal, and in (C) of FIG. 2 shown is the case in which N-point data for each of three continuous transmission symbols for a total of 3×N-point data are selected. Here, one block length is N points, the transmission-symbol length is the block length (=N symbols)+guard interval length, and the block length N is much longer than the maximum delay spread $\tau$ max that is determined from the channel model.

(b) Transmitter in Single-Carrier Communication

Figure 9:
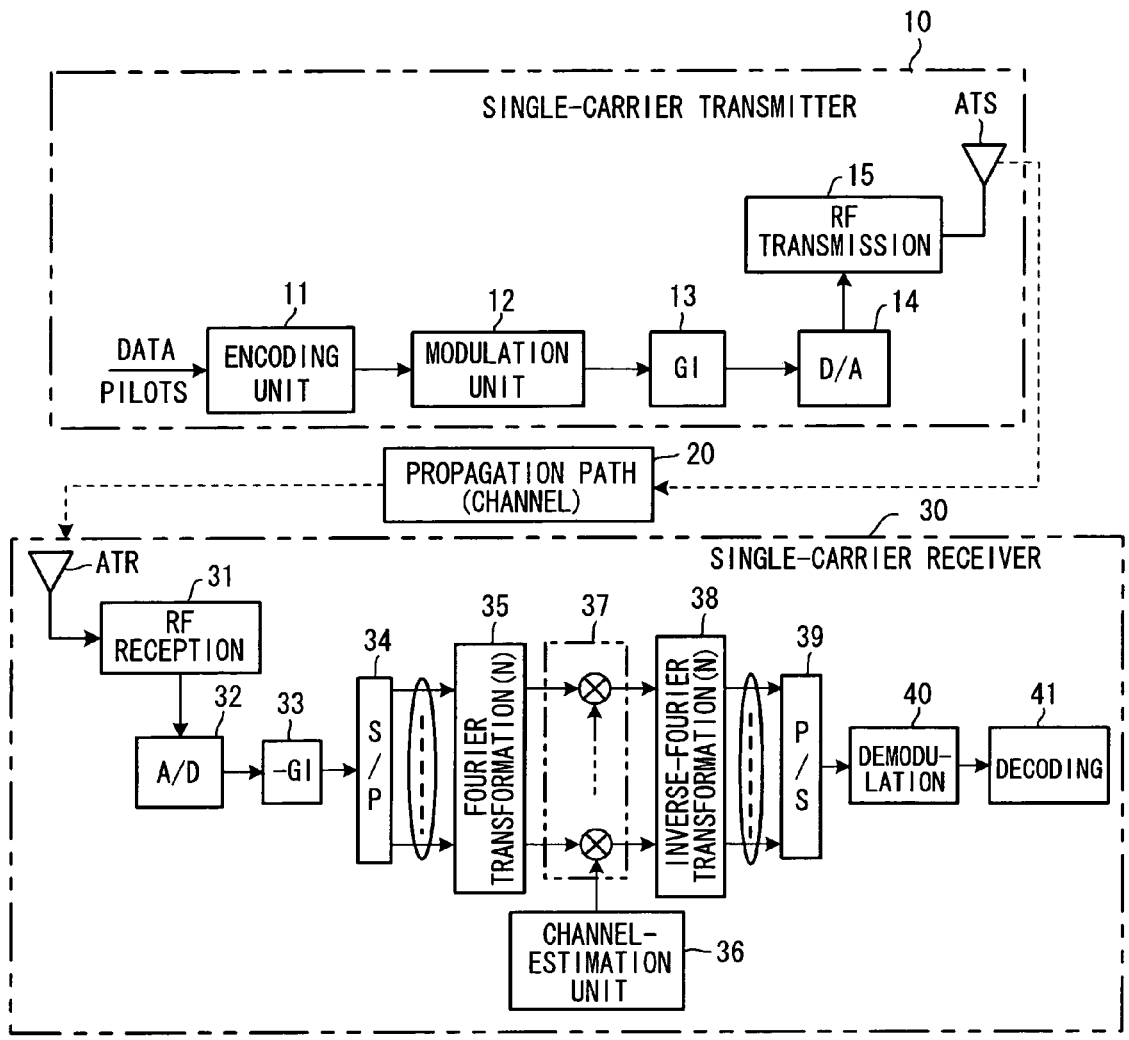
FIG. 9 is a block diagram of a prior single-carrier-transmission system.
Figure 10:
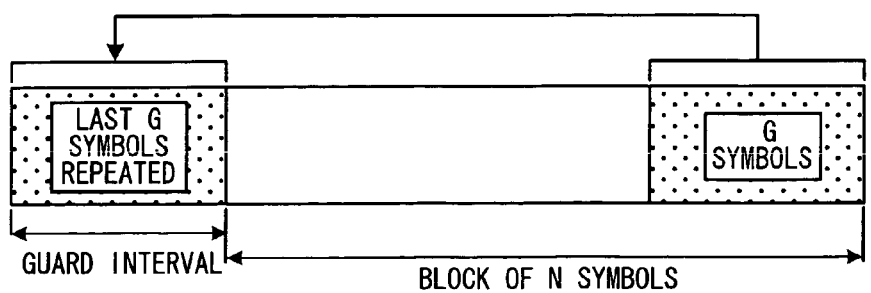
FIG. 10 is a drawing explaining the insertion of guard intervals.

The construction of the single-carrier transmitter is the same as that of the prior art shown in FIG. 9. The transmitter encodes binary data using a specified encoding method (convolution encoding, turbo encoding, etc.), and then modulates the data using a specified modulation method (for example, QPSK modulation method). Furthermore, the transmitter adds a guard interval to the start, and forms blocks (transmission symbols) comprising N data, then converts the data to a radio signal and transmits it from an antenna.

(c) Receiver in Single-Carrier Communication

Figure 3:
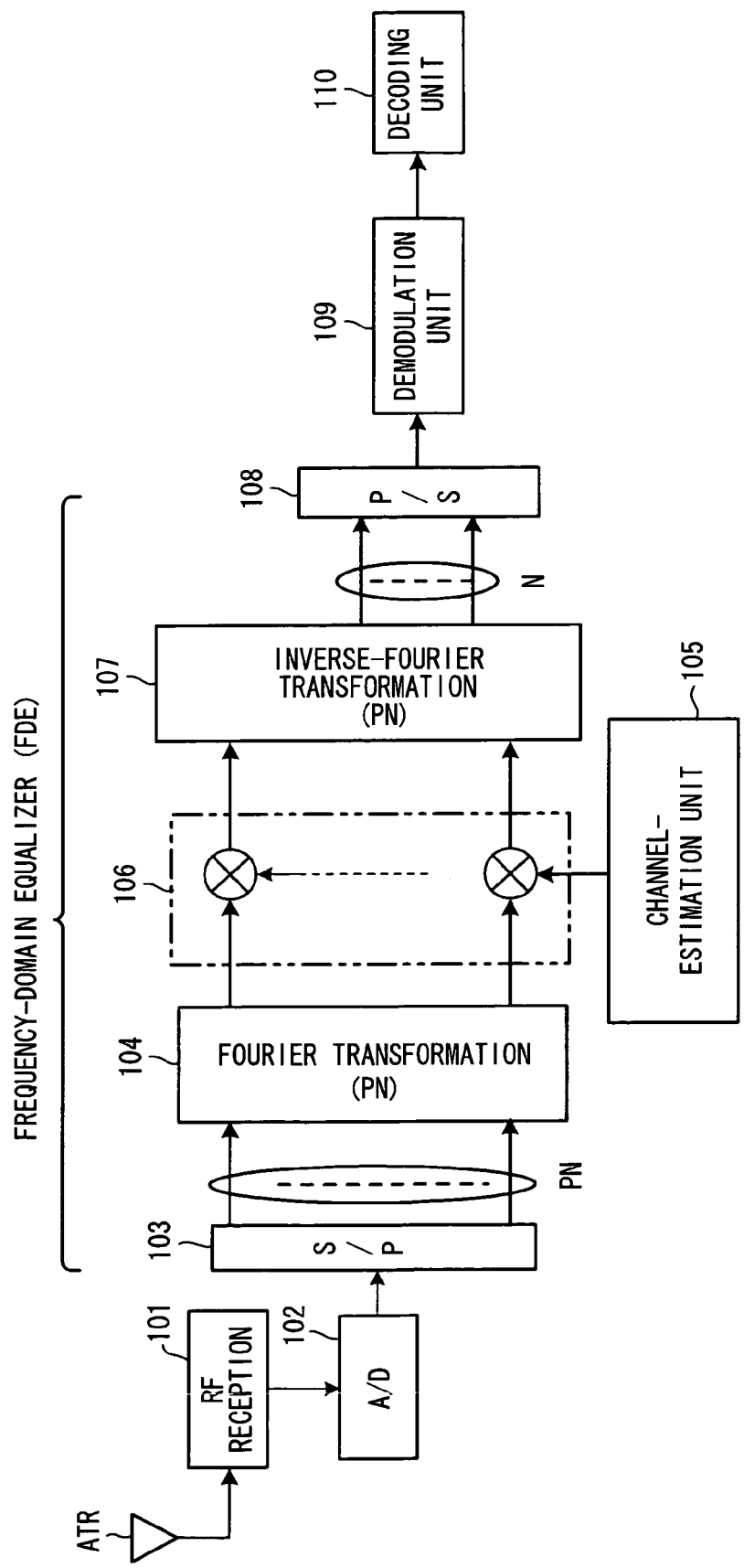
FIG. 3 is a block diagram of the single-carrier receiver of the present invention.

FIG. 3 is a block diagram of the single-carrier receiver of this invention. The receiver of this invention enlarges the size of the symbols processed by the frequency-domain equalizer by P times in order to reduce the effect of ISI. In order to do that, it enlarges the Fourier-transformation size (number of FFT points) of the Fourier-transformation unit of the frequency-domain equalizer by P·N points. By doing this, it is possible to reduce the effect of the previous data block.

A radio receiving unit 101 filters the signal that is received from an antenna ATR, and together with removing the unneeded frequency component, converts the frequency of the radio signal to a baseband frequency, and an analog-to-digital converter 102 converts that baseband signal from analog to digital, and inputs the result to a S/P conversion unit 103 of a single-carrier-frequency-domain equalizer (SC-FDE). The single-carrier-frequency-domain equalizer (SC-FDE) comprises a S/P conversion unit 103, Fourier-transformation unit 104, channel-estimation unit 105, channel-compensation unit 106, inverse-Fourier-transformation unit 107 and P/S conversion unit 108.

The S/P conversion unit 103 converts the P·N number of serial time-sequence data to parallel data having a specified phase difference, for example a phase difference of one block length (=N) as shown in (D) of FIG. 1, and in parallel inputs that data in order to the P·N-point Fourier-transformation unit (DFT or FFT) 104. The P·N-point Fourier-transformation unit (DFT or FFT) 104 performs P·N-point Fourier transformation of the P·N number of time-sequence data, and outputs P·N number of sub-carrier components. The channel-estimation unit 105 estimates channel characteristics for the P·N number of sub carriers using a method that will be described later that uses pilot symbols that are sent periodically, and the channel-compensation unit 106 multiplies the P·N number of sub-carrier components that are output from the Fourier-transformation unit by a channel-compensation coefficient to perform channel compensation. The P·N-point inverse-Fourier-transformation unit 107 performs P·N-point inverse-Fourier transformation of the P·N number of channel-compensated sub-carrier data to generate P·N number of time-sequence data, then outputs N number of time-sequence data from the middle of the P·N number of data that do not include guard intervals, and the P/S conversion unit 108 converts the N number of time-sequence data in order to serial data and outputs the result. The demodulator 109 performs QPSK demodulation of the signal for which frequency-domain equalization has been performed, and the decoder 110 decodes the demodulated data and outputs the decoded received data.

The first aspect in which the receiver of the present invention shown in FIG. 3 differs from the receiver of the prior art shown in FIG. 9 is that guard intervals are not deleted. In other words, in the receiver of this invention, frequency-domain equalization processing must be performed for all received signals, including the redundant portion (guard intervals). The second aspect in which the receiver of this invention differs is that in this invention P·N-point Fourier transformation is performed, after which, channel distortion in the frequency domain is compensated for using a well-known channel-compensation technique such as the zero-forcing (ZF) method or minimum-mean-square-error (MMSE) method. A third aspect in which the receiver of this invention differs is that P·N-point inverse Fourier transformation is executed before demodulation and decoding, and the signal dimension is restored to N by selecting N number of transformation results from the P·N-point inverse Fourier transformation results.

In order to maintain the necessary continuity for frequency-domain equalization, P·N number of point data must be accurately selected from the received signal. (A), (B) and (C) of FIG. 2 show three possible selection methods for the case in which P=3. (A) and (B) of FIG. 2 show cases in which guard intervals are included in the received signal, and (C) of FIG. 2 shows a case in which guard intervals are not included in the received signal. It is required in cluster selection that the processed signal includes at least the previous data block portion, current data block portion and next data block portion.

The single-carrier-expansion-type frequency-domain-equalization process of the present invention described above can be summarized into the following three steps. In the first step, the latest P·N number of point data having a N-point phase difference are selected in order and supplied to the Fourier-transformation unit. In the second step, channel distortion is compensated for in all of the P·N sub carriers. In the third step, P·N-point inverse-Fourier transformation is performed, then N number of continuous points are accurately selected from the inverse-Fourier-transformation results and the dimension of the received signal is reduced to N points.

The single-carrier-receiving method of the present invention will be explained below using equations.

(d) Analysis of the Single-Carrier-Receiving Method of the Present Invention

In order to perform P·N-point inverse-Fourier transformation, P·N number of continuous data must be selected (cluster selection). Also, in the case in which guard intervals are included in the received signal, it is necessary to perform cluster selection without deleting the guard intervals. In order to maintain continuity of a processing frame, 'continuity' of the data is very important. Cases of cluster selection for when P=3 and in which guard intervals are included are shown in (A) and (B) of FIG. 2.

Supposing that a propagation channel is such that it comprises PATH number of discrete paths having different amplitude and delay characteristics, the baseband impulse response can be expressed by the following equation.

$$h(t, \tau) = \sum_{v=0}^{PATH-1} \alpha_v(t) \cdot \delta(\tau - \tau_v) \quad (3)$$

Here, $\alpha_v$ and $\tau_v$ are the channel gain and delay time of the Vth discrete path. Furthermore, in order for simulation, the total channel power is equal to 1. Also, it is assumed that $\tau max = \max \tau_j < N$. In other words, the maximum delay is taken to be smaller than the period of one transmission symbol. Actually, when coherent detection is performed, there is no interference from more than one transmission symbol.

In a frequency domain, the channel transmission function H(f, t) is expressed by the following equation.

$$H(f, t) = \sum_{v=0}^{PATH-1} \alpha_v \cdot \exp[-j2\pi f \tau_v] \quad (4)$$

A received baseband signal after deletion of the guard intervals is expressed by the following equations.

$$r_k^{(i)} = \sum_{v=0}^{Pint-1} \alpha_v \cdot x_{k-\tau_v}^{(i)} + \sum_{v=Pint}^{PATH-1} \alpha_v \cdot x_{N-\tau_v+k}^{(i-1)} + \tilde{n}_k^{(i)} \quad \forall\, 0 \leq k < \tau_v \quad (5)$$

$$r_k^{(i)} = \sum_{v=0}^{PATH-1} \alpha_v \cdot x_{k-\tau_v}^{(i)} + \tilde{n}_k^{(i)} \quad \forall\, \tau_v \leq k < N_v$$

where $r_k^{(i)}, h_k, x_k^{(i)}, P_{int}, \tilde{n}_k^{(i)}$ are the kth received data, kth channel impulse response in the time domain, kth transmission data, number of pulses having a delay spread longer than the current processing data, and kth additive white Gaussian noise (AWGN), respectively in the ith block.

Here, the input signal for P·N-point FFT is given by the following equation.

$$\bar{y}^{(i)} = \lfloor y_0^{(i)} \cdots y_{P\cdot N-1}^{(i)} \rfloor \quad (6)$$
$$= [\bar{r}^{(i-P+2)} \cdots \bar{r}^{(i)} \bar{r}^{(i+1)}]$$

However, $$\bar{r}^{(i)} = [r_0^{(i)} \ldots r_k^{(i)} \ldots r_{N-1}^{(i)}]^T$$

are the N number of received signals of the ith block. In the examples shown in FIG. 2, P=3.

After data is received, P·N number of continuous points are selected and input to P·N-point FFT. The signal after the Fourier-transformation operation is expressed by one of the following equations.

$$Y_m^{(i)} = \beta \sum_{k=0}^{P\cdot N-1} y_k^{(i)} \cdot e^{-j\frac{2\pi}{P\cdot N} k \cdot m} \quad 0 \leq m < P\cdot N - 1 \quad (7)$$

or $$Y_m^{(i)} = \beta \sum_{q=0}^{P-1} \sum_{k=0}^{N-1} y_k^{(i+1-P+q)} \cdot e^{-j\frac{2\pi}{P\cdot N}(P\cdot N+k)\cdot m} \quad 0 \leq m < P\cdot N - 1 \quad (8)$$

Here, $$\bar{Y}^{(i)} = \lfloor Y_0^{(i)} \ldots Y_{P\cdot(N-1)}^{(i)} \rfloor$$

is the output of P·N-point FFT, and β is a normalization factor. By definition, this can be expressed by the following equation.

$$\bar{Y}^{(i)} = \bar{H}_{PN \times PN} \cdot [\bar{X}^{(i-P+2)} \ldots \bar{X}^{(i)} \bar{X}^{(i+1)}] \quad (9)$$

Here, $$\bar{H}_{PN \times PN}$$

is the P·N×P·N dimension channel response in the frequency domain, and $$\bar{X}^{(i)} = \lfloor X_0^{(i)} \ldots X_{N-1}^{(i)} \rfloor.$$

In the next step, the effect of channel distortion is reduced by compensating for the degradation of both the amplitude and phase in the frequency domain. The channel is equalized for each of the P·N number of sub carriers.

By taking $$\bar{G}_{PN \times PN}$$

to be the matrix expression of the channel-normalization factor, channel compensation in the frequency domain is given by the following equations.

$$\bar{V}^{(i)} = \bar{G}_{PN \times PN} \cdot \bar{Y}^{(i)} \quad (10)$$

$$\bar{V}^{(i)} = \bar{G}_{PN \times PN} \cdot \bar{H}_{PN \times PN} \cdot [\bar{X}^{(i-P+2)} \ldots \bar{X}^{(i)} \bar{X}^{(i+1)}] \quad (11)$$

Here, $$\bar{V}^{(i)} = \lfloor v_0^{(i)} v_1^{(i)} \ldots v_{P\cdot N-1}^{(i)} \rfloor.$$

After compensating for the channel distortion in the frequency domain it become necessary to reduce the dimension of data from P·N to N. Therefore, in a first method, P·N-point inverse-Fourier transformation is performed for $\bar{V}^{(i)}$ in Equation (11), and N number of point data that do not have guard intervals are extracted and output from among the P·N number of processing results in the time domain.

In a second method of reducing the data dimension, matrix transformation is used to directly transform the P·N-point signal to a N-point serial stream. By expressing this transformation matrix by the following equation $$\overline{W}_{N \times PN} = [w_{q,k}]_{0 \leq q < N, 0 \leq k < PN} \quad (12)$$

the matrix elements $\omega_{q,k}$ are given by the following equation.

$$w_{q,k} = \beta \cdot e^{j\frac{2\pi}{P \cdot N} q \cdot k} \cdot e^{-j\frac{4\pi}{P} \cdot k} \quad (13)$$

In other words, the equation above is for matrix elements of a transformation matrix that transforms the P·N number of equalization results in the frequency domain to N number of time-sequence data in the time domain by IFFT, and $\beta$ is a normalization factor.

From the above, the output of the frequency-domain equalizer (FDE) of this invention can be given by the following equation.

$$\overline{X}^{(i)} = \overline{W}_{N \times PN} \cdot \overline{V}^{(i)} \quad (14)$$

Where $\hat{X}^{(i)}$ are N number of signals that are input to the demodulator.

Finally, demodulation is performed, and after decoding, judgment of the bit information is performed. A feature of the second method of this invention is that transformation to the time domain is performed by P·N-point inverse Fourier transformation using Equation (14), and after that, N points are properly selected.

Figure 4:
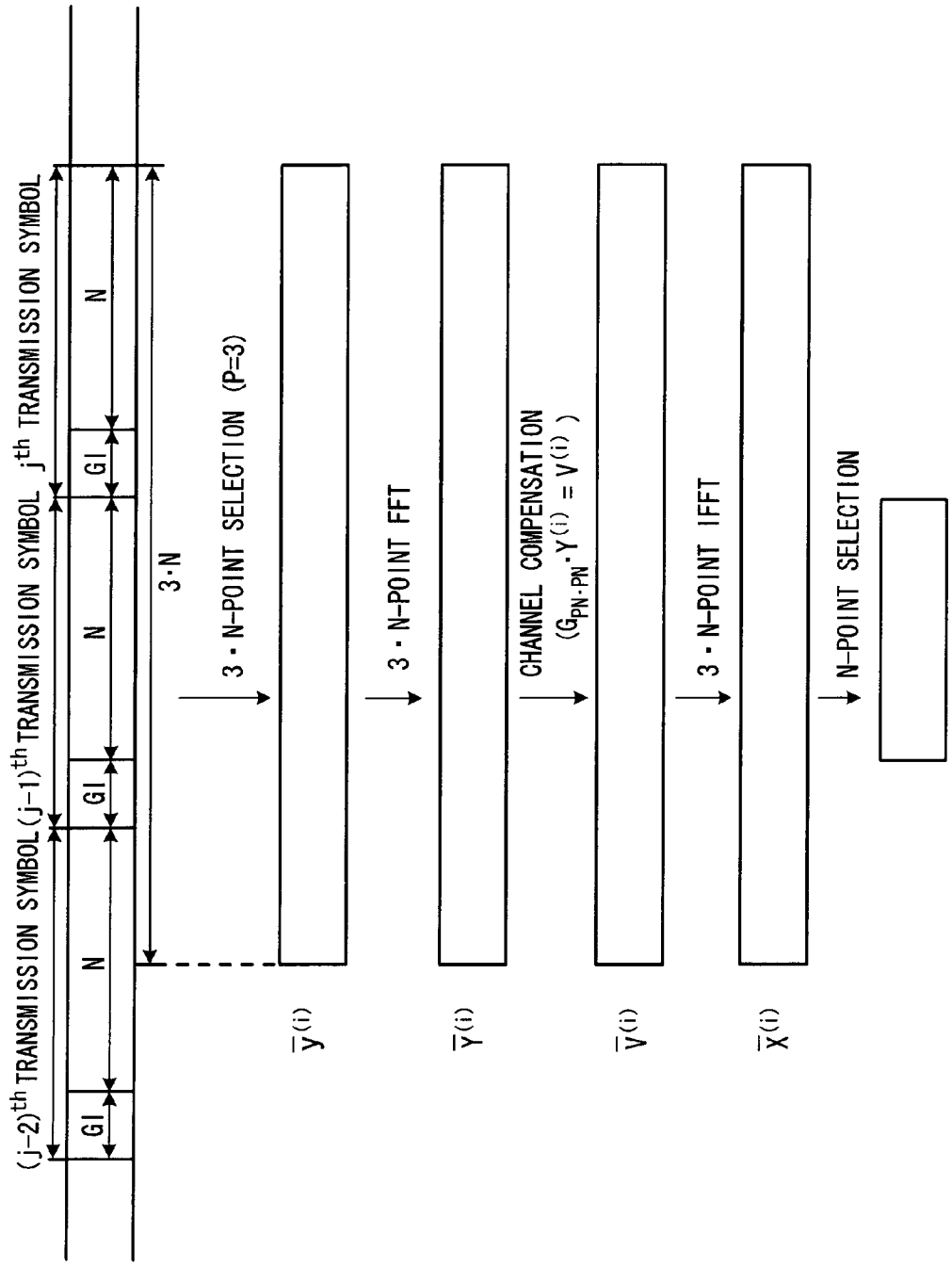
FIG. 4 shows the processing sequence when P=3.

FIG. 3 shows an example of reducing the data dimension by using the first method, and FIG. 4 shows the processing sequence when P=3.

(e) Example of a Modified Form of the Embodiment

Figure 5:
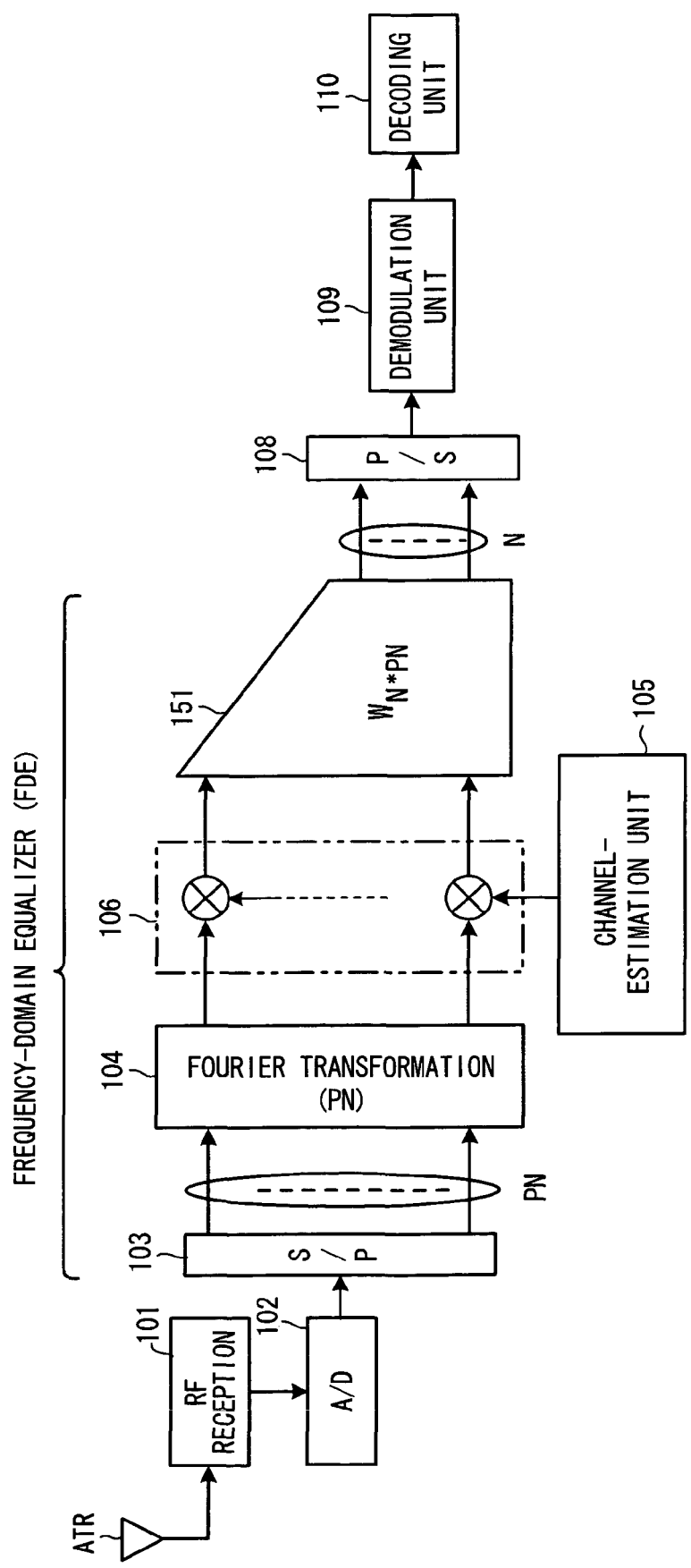
FIG. 5 is another block diagram of a single-carrier receiver that reduces the data dimension.

FIG. 5 is a drawing showing the construction of a single-carrier receiver when the data dimension is reduced using the second method, and the same reference numbers are given to parts that are the same as in FIG. 3. This receiver differs in that instead of the inverse-Fourier-transformation unit 107, an operation unit 151 is used to calculate $\hat{X}^{(i)}$ using Equation (14). By performing the calculation of Equation (14), it is possible to reduce the amount of calculation when compared with performing inverse Fourier transformation by the inverse-Fourier-transformation unit 107 shown in FIG. 3.

(f) Construction of the Channel Estimation Unit

Figure 6:
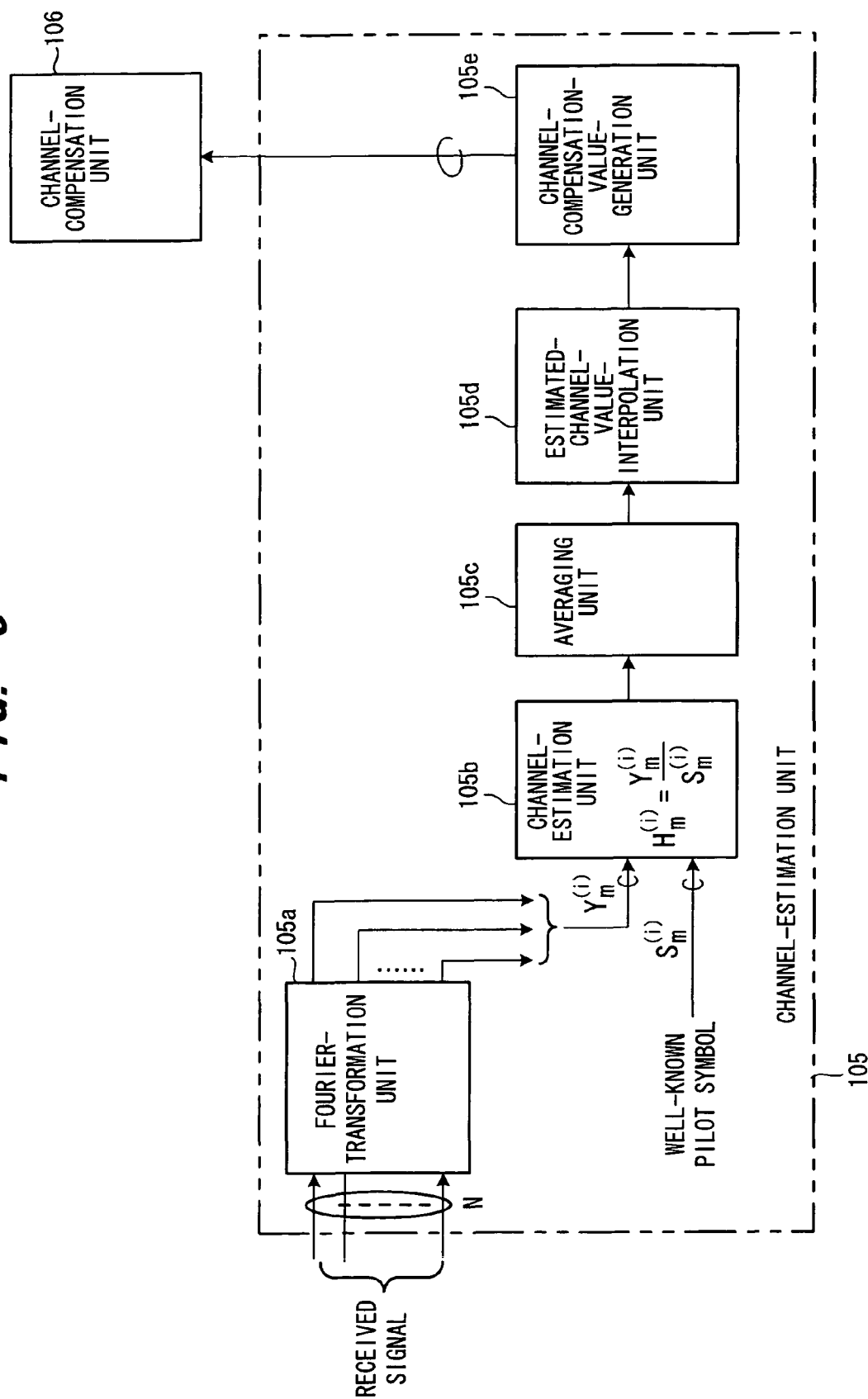
FIG. 6 is a block diagram of a channel-estimation unit.

FIG. 6 is a drawing showing the construction of the channel-estimation unit 105. In order to estimate the channel distortion in the frequency domain, pilot symbols are time multiplexed over the data in the transmission frame. In order to convert to a signal in the frequency domain on the receiving side, N-point Fourier transformation is performed on the received pilot signal. Using N number of pilot symbols, the channel distortion is estimated by calculating the following equation.

$$\tilde{H}_m^{(i)} = Y_m^{(i)} / \hat{S}_m^{(i)} \quad 0 \leq m < N \quad (15)$$

Here, $\tilde{H}_m^{(i)}, Y_m^{(i)}$ and $\hat{S}_m^{(i)}$ are the estimated channel response, received signal and a well-known pilot symbol for the ith user and mth sub carrier, respectively.

From the above, in the channel-estimation unit 105, a Fourier-transformation unit 105a uses N number of pilot symbols to perform N-point FFT transformation and generate N number of sub-carrier signal components, and a channel-estimation unit 105b performs the calculation according to Equation (15) and estimates each sub-carrier channel. An averaging unit 105c performs the calculation of the following equations $$\hat{H}_m^{(i)} = \begin{cases} \dfrac{1}{2N_p} \cdot \sum_{j=0}^{1} \sum_{n=0}^{N_p-1} \tilde{H}_{n,j}^{(i)} & m = 0 \\ \dfrac{1}{3N_p} \cdot \sum_{j=-1}^{1} \sum_{n=0}^{N_p-1} \tilde{H}_{n,m+j}^{(i)} & 1 \leq m < N-1 \\ \dfrac{1}{2N_p} \cdot \sum_{j=-1}^{0} \sum_{n=0}^{N_p} \tilde{H}_{n,N-1+j}^{(i)} & m = N-1 \end{cases} \quad (16)$$

and by taking the average in both time domain and frequency domain, averages and outputs estimated values for the channels. Here, one transmission frame comprises Np number of pilot-transmission symbols and Nd number of data-transmission symbols.

The first summation $\Sigma$ on the right side of Equation (16) adds the estimated channel values for two or three sub carriers, and the second summation $\Sigma$ adds Np number of estimated channel values in the time domain. In other words, in the equation for the first item on the right side, when m=0 means that Np number of estimated channel values for both the first and second sub carriers will be added and averaged. In the equation of the second item, when $1 \leq m < N-1$, then Np number of estimated channel values for each of three adjacent sub carriers are added and averaged, and in the equation of the third item, when m=N−1, Np number of estimated channel values for each of the last two sub carriers are added and averaged.

From the above, estimated channel values for N number of sub carriers are obtained as shown in (A) of FIG. 7.

Next, in order to achieve frequency-domain equalization for P·N number of sub carriers, a channel-estimated-value-interpolation unit 105d interpolates P number of estimated channel values between each adjacent estimated channel value using the following equation, $$\hat{H}_{P,m+q}^f = \frac{1}{P} \cdot \{(P-q) \cdot \hat{H}_m + q \cdot \hat{H}_{m+1}\} \quad (17)$$

$$\forall \, 0 \leq m < N, \quad \forall \, 0 \leq q < P$$

and performs P·N-point frequency-domain channel estimation. The equation above is an interpolation equation that interpolates P number of values $\hat{H}_{P,m+q}^f$ between two adjacent values $\hat{H}_m, \hat{H}_{m+1}$, and as shown in (B) of FIG. 7, gives estimated channel values for the mth sub carrier in the P·N-point frequency domain.

A channel-compensation-value-generation unit 105e uses the estimated channel values from Equation (17) to generate channel compensation values (equalization coefficients) using the MMSE method or ZF method, and a channel-compensation unit 106 multiplies the P·N number of Fourier-transformation results that were output from the Fourier-transformation unit 104 by the equalization coefficients, and performs channel compensation. When using the MMSE method, the equalization coefficients are given by the following equations.

$$G_{k,m}^{MMSE} = \begin{cases} \dfrac{\hat{H}_m^{f*}}{\left|\hat{H}_m^f\right|^2 + \sigma_n^2} & \text{if } k = m \\ 0 & \text{otherwise} \end{cases} \quad (18)$$

Here, $\sigma_n^2$ is the noise distribution. Also, when generating the equalization coefficients using the ZF method, the equalization coefficients are given by the following equations.

$$G_{k,m}^{ZF} = \begin{cases} \dfrac{\hat{H}_m^{f*}}{\left|\hat{H}_m^f\right|^2} & \text{if } k = m \\ 0 & \text{otherwise} \end{cases} \quad (19)$$

(B) Second Embodiment

Figure 8:
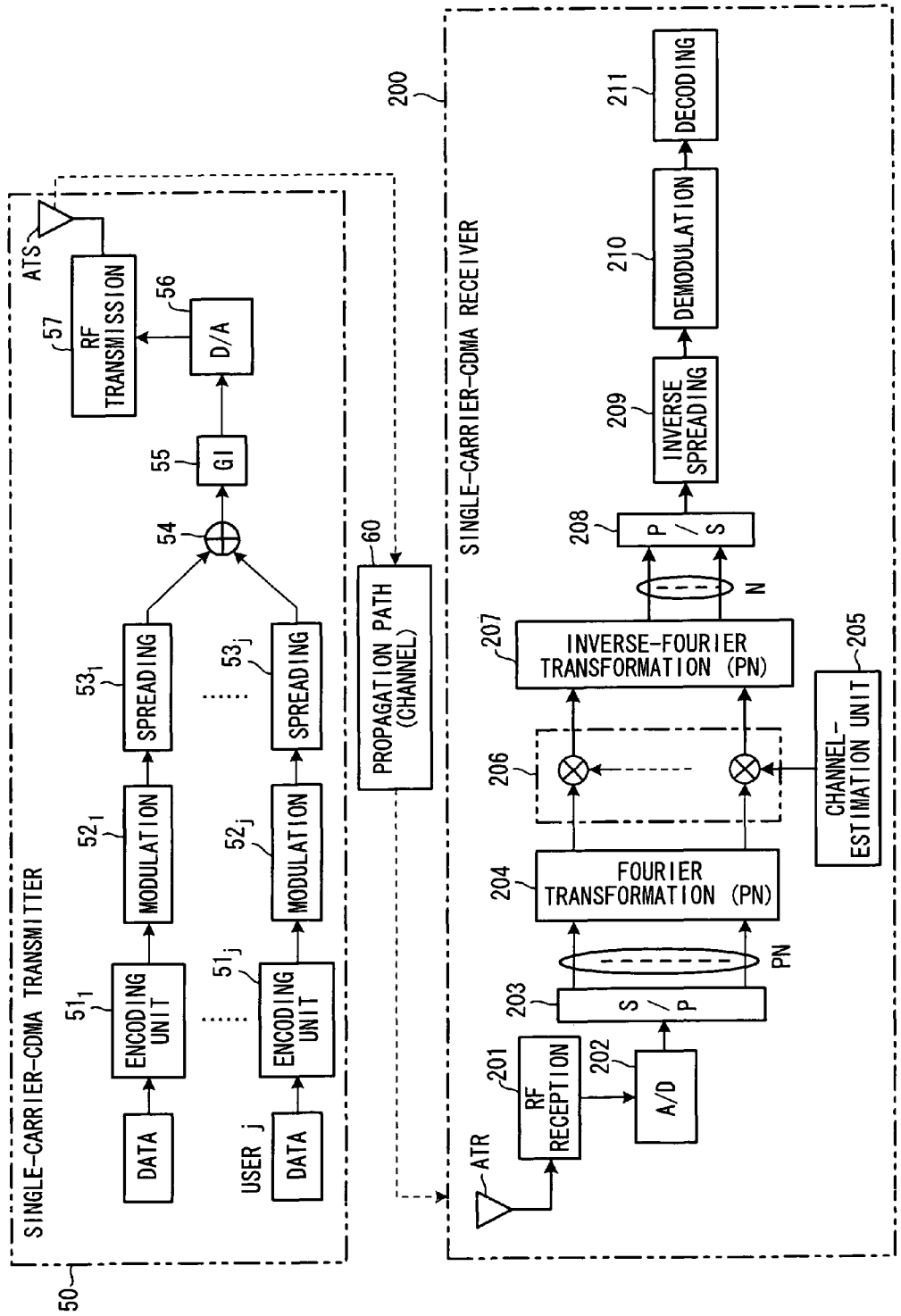
FIG. 8 is a block diagram of a single-carrier CDMA system.
Figure 11:
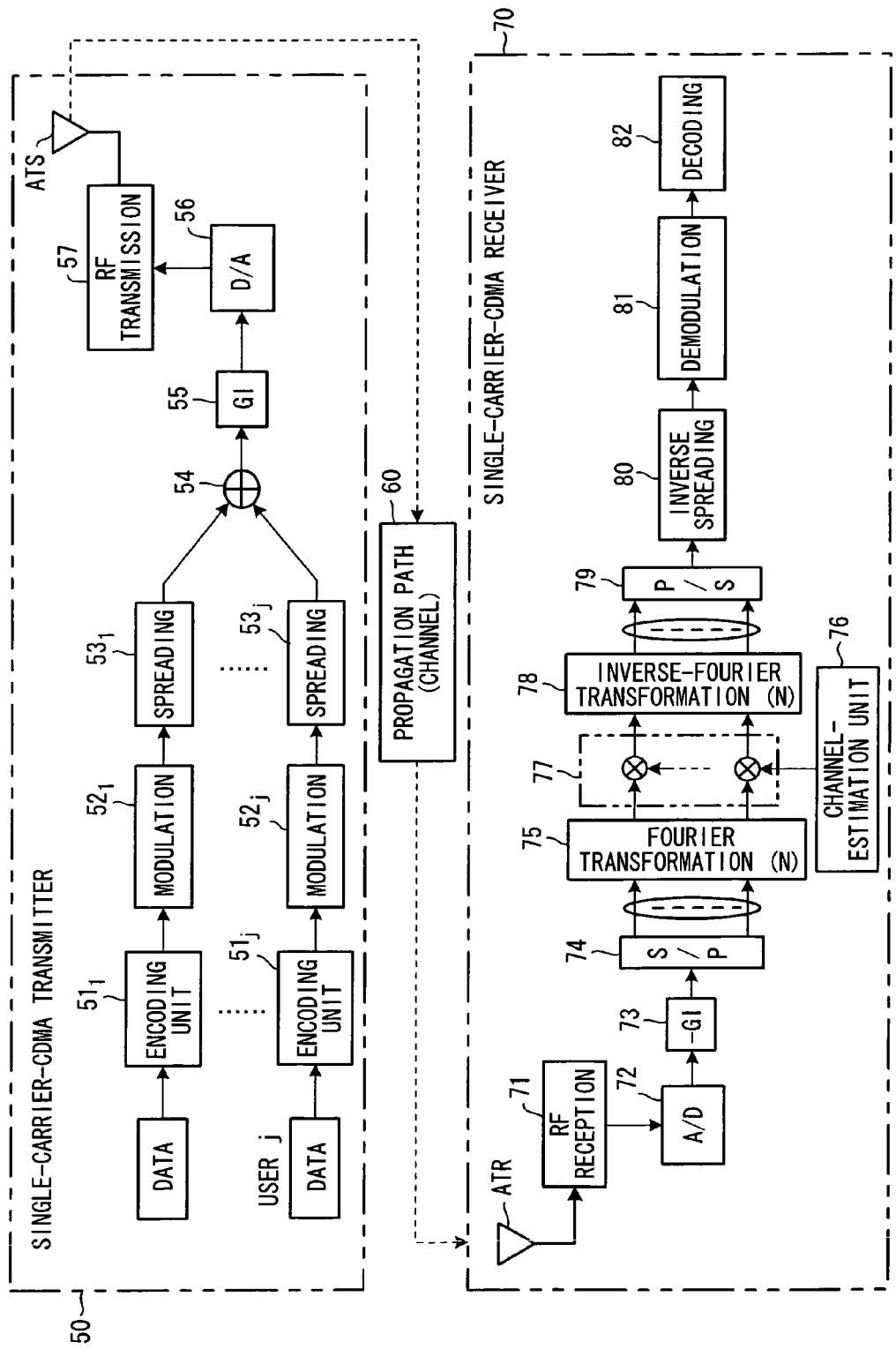
FIG. 11 is a block diagram of a prior single-carrier CDMA transmission system.
Figure 12:
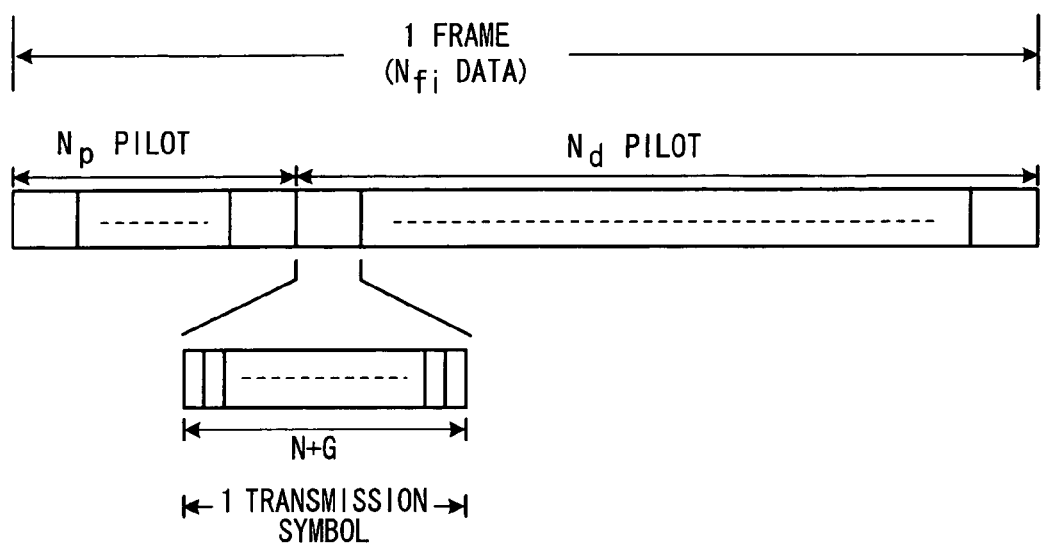
FIG. 12 is a drawing explaining the data format.

FIG. 8 is a block diagram of a single-carrier CDMA system, where the construction of the single-carrier CDMA transmitter is the same as that shown in FIG. 11, so the same reference numbers are given to identical parts. Also, the data format has the same configuration as that shown in FIG. 12.

In the single-carrier CDMA receiver 200, a radio-receiving unit 201 filters the signals that are received from the antenna ATR, and together with removing the unneeded frequency component, converts the frequency of the radio signal to a baseband frequency, and an analog-to-digital converter 202 converts the baseband signal to a digital signal, and inputs the result to the S/P conversion unit 203 of the single-carrier-frequency-domain equalizer (SC-FDE). The single-carrier-frequency-domain equalizer (SC-FDE) comprises a S/P conversion unit 203, Fourier-transformation unit 204, channel-estimation unit 205, channel-compensation unit 206, inverse-Fourier-transformation unit 207 and P/S conversion unit 208.

The S/P conversion unit 203 converts P·N number of time-sequence data that includes guard intervals in order to parallel data having a specified phase difference such as an N-point phase difference as shown in (D) of FIG. 1, and inputs the result to the P·N-point Fourier-transformation unit 204. The P·N-point Fourier-transformation unit 204 performs P·N-point Fourier transformation of the P·N number of time sequence data and outputs P·N number of sub-carrier components. The channel-estimation unit 205 uses pilot symbols that are periodically sent, and estimates the channel characteristics for P·N number of sub carriers by the method explained in FIG. 6, and the channel-compensation unit 206 multiplies the P·N number of sub-carrier components that were output from the Fourier-transformation unit by channel-compensation coefficients to perform channel compensation. The P·N-point inverse-Fourier-transformation unit 207 performs P·N-point inverse Fourier transformation of the P·N number of channel compensated sub-carrier data, and generates P·N number of time-sequence data, and then outputs N number of time-sequence data from among the P·N number of data that do not include guard intervals, and the P/S conversion unit 208 converts the N number of time-sequence data into serial data and outputs the result. An inverse-spreading unit 209 multiplies the serially input data by an inverse-spreading code (same code as the spreading code) to perform inverse spreading, a demodulation unit 210 performs QPSK demodulation of the signal for which frequency-domain equalization and inverse spreading have been performed, and a decoding unit 211 decodes the demodulated data and outputs the decoded received data.

The single-carrier CDMA receiver shown in FIG. 8 differs from the prior receiver shown in FIG. 11 in that: (1) guard intervals are not removed; (2) P·N-point Fourier transformation is performed on P·N number time sequence data; (3) channel distortion in the frequency domain is compensated for by using a well know technique on the P·N number of sub-carrier components such as the zero forcing (ZF) method or minimum-mean-square-error (MMSE) method; (4) P·N-point inverse Fourier transformation is executed before demodulation and decoding; and (5) N number of transformation results are selected from P·N number of inverse-Fourier-transformation results to restore the signal dimension to N.

In order to maintain the necessary continuity for frequency-domain equalization, P·N-point data must be accurately selected from the received signal. Therefore, when P=3 and guard intervals are included in the received signal, the S/P conversion unit 203 employs cluster selection as shown in (A) or (B) of FIG. 2, and when guard intervals are not included in the received signal, employs cluster selection as shown in (C) of FIG. 2 to perform serial to parallel conversion.

With the invention described above, it is possible for single-carrier communication to not receive the effect of inter-symbol interference even though propagation delay that is greater than the guard interval occurs. Also, even when guard intervals are not inserted, it is possible to not receive the effect of inter-symbol interference even when large propagation delay occurs.

What is claimed is:

1. A frequency-domain-equalization method for a receiver in single-carrier communication, comprising:
   receiving a signal including signal blocks, each having a predetermined length, transmitted from a transmitter;
   selecting continuously a time-sequence signal portion that is longer than the predetermined length of one signal block from a received signal;
   performing Fourier transformation and converting said time-sequence signal portion that is longer than the predetermined length of one signal block to frequency-domain signals;
   performing channel compensation of the frequency-domain signals in the frequency domain; and
   performing inverse-Fourier transformation of the channel-compensated signals, generating a time-sequence signal portion that is longer than the predetermined length of one signal block, then selecting and outputting a time-sequence signal portion of the predetermined length from a middle of the inverse-Fourier-transformation results.

2. A frequency-domain-equalization method for a receiver in single-carrier communication, comprising:
   selecting continuously a time-sequence signal portion that is longer than one block from a received signal;
   performing Fourier transformation and converting said time-sequence signal portion that is longer than one block to frequency-domain signals;
   performing channel compensation of the frequency-domain signals in the frequency domain; and
   performing inverse-Fourier transformation of the channel-compensated signals, generating a time-sequence signal portion that is longer than one block, then selecting and outputting a one-block time-sequence signal portion from a middle of the inverse-Fourier-transformation results, wherein
   in selecting continuously a time-sequence signal portion, a time-sequence signal portion that is P times longer than the length N of the signal portion of one block (P is an integer that is 2 or greater) is selected from the received signal and input to a P·N-point Fourier-transformation unit, in performing Fourier transformation, performing P·N-point Fourier-transformation and generating P·N frequency-domain signals;

in performing channel compensation, performing channel compensation of the P·N frequency-domain signals, and in performing inverse-Fourier transformation of the channel-compensated signals, performing inverse-Fourier transformation of the P·N channel-compensated signals, then selecting and outputting a middle one-block time sequence of the length N from the P·N inverse-Fourier-transformation results.

3. A frequency-domain-equalization method for a receiver in single-carrier communication, comprising:

selecting continuously a time-sequence signal portion that is longer than one block from a received signal;

performing Fourier transformation and converting said time-sequence signal portion that is longer than one block to frequency-domain signals;

performing channel compensation of the frequency-domain signals in the frequency domain; and performing inverse-Fourier transformation of the channel-compensated signals, generating a time-sequence signal portion that is longer than one block, then selecting and outputting a one-block time-sequence signal portion from a middle of the inverse-Fourier-transformation results, wherein in selecting continuously a time-sequence signal portion, a time-sequence signal portion that is P times longer than the length N of the signal portion of one block (P is an integer that is 2 or greater) is selected from the received signal and input to a P·N-point Fourier-transformation unit, and when guard intervals are included in said received signal, said time-sequence signal portion consisted of P·N number of continuous time-sequence data is selected without removing the guard intervals, and input to the Fourier-transformation unit; and in performing inverse-Fourier transformation of the channel-compensated signal, a one-block time-sequence signal portion that does not include guard intervals is selected from the inverse-Fourier-transformation results.

4. The frequency-domain-equalization method of claim 2, wherein guard intervals are not included in the received signal.

5. A frequency-domain-equalization method for a receiver in single-carrier communication, comprising:

selecting continuously a time-sequence signal portion that is longer than one block from a received signal;

performing Fourier transformation and converting said time-sequence signal portion that is longer than one block to frequency-domain signals;

performing channel compensation of the frequency-domain signals in the frequency domain; and performing inverse-Fourier transformation of the channel-compensated signals and outputting a one-block time-sequence signal portion from the inverse-Fourier-transformation results, wherein in selecting continuously a time-sequence signal portion, a time-sequence signal portion that is P times longer than the length N of the signal portion of one block (P is an integer that is 2 or greater) is selected from the received signal and input to a P·N-point Fourier-transformation unit, in performing Fourier transformation, performing P·N-point Fourier-transformation and generating P·N frequency-domain signals, in performing channel compensation, performing channel compensation of the P·N frequency-domain signals, and in performing inverse-Fourier transformation of the channel-compensated signals, performing the inverse-Fourier transformation and output of a one-block time-sequence signal portion by calculation that converts the P·N frequency-domain signals into a one-block time-sequence signal portion in the time domain.

6. A frequency-domain-equalization method for a receiver in single-carrier communication, comprising:

selecting continuously a time-sequence signal portion that is longer than one block from a received signal;

performing Fourier transformation and converting said time-sequence signal portion that is longer than one block to frequency-domain signals;

performing channel compensation of the frequency-domain signals in the frequency domain; and performing inverse-Fourier transformation of the channel-compensated signals, generating a time-sequence signal portion that is longer than one block, then selecting and outputting a one-block time-sequence signal portion from a middle of the inverse-Fourier-transformation results, wherein in selecting continuously a time-sequence signal portion, a time-sequence signal portion that is P times longer than the length N of the signal portion of one block (P is an integer that is 2 or greater) is selected from the received signal and input to a P·N-point Fourier-transformation unit, and the channel compensation is performed by:

performing Fourier transformation of N number of continuous time-sequence data and estimating N number of channels in the frequency domain;

interpolating (P-1) number of estimated channel values between each adjacent estimated channel values, and acquiring P·N number of estimated channel values in the frequency domain;

calculating channel compensation coefficients from the estimated channel values; and multiplying the Fourier-transformation results from said P·N-point Fourier-transformation unit by the channel-compensation coefficients to perform channel compensation in the frequency domain.

7. The frequency-domain-equalization method of claim 6 wherein said channel-compensation coefficients are generated using the estimated channel values by the zero forcing (ZF) method.

8. The frequency-domain-equalization method of claim 6 wherein said channel-compensation coefficients are generated using the estimated channel values by the minimum-mean-square-error (MMSE) method.

9. The frequency-domain-equalization method of claim 2 further comprising performing inverse spreading of the one-block time-sequence signal portion that was selected from said inverse-Fourier-transformation results when said received signal is modulated by CDMA modulation.

10. A frequency-domain-equalization apparatus for a receiver in single-carrier communication, comprising:
- a receiving unit that receives a signal including signal blocks, each having a predetermined length, transmitted from a transmitter;
- a first selection unit that selects continuously a time-sequence signal portion that is longer than the predetermined length of one signal block from a received signal;
- a Fourier-transformation unit that performs Fourier transformation of that time-sequence signal portion that is longer than the predetermined length of one signal block and converts it to frequency-domain signals;
- a channel-compensation unit that estimates channels in the frequency domain and performs channel compensation of the frequency-domain signals;
- an inverse-Fourier-transformation unit that performs inverse Fourier transformation of the channel-compensated signals and generates a time-sequence signal portion that is longer than the predetermined length of one signal block; and
- a second selection unit that selects a time-sequence signal portion of the predetermined length from a middle of the inverse Fourier transformation results.

11. A frequency-domain-equalization apparatus for a receiver in single-carrier communication, comprising:
- a selection unit that selects continuously a time-sequence signal portion that is longer than a predetermined length of one signal block from a received signal;
- a Fourier-transformation unit that performs Fourier transformation of that time-sequence signal portion that is longer than the predetermined length of one signal block, and converts it to a frequency-domain signal;
- a channel-compensation unit that estimates channels in the frequency domain and performs channel compensation of the frequency-domain signal; and
- a computation unit that performs inverse Fourier transformation of the channel-compensated signal, and selects and outputs a time-sequence signal portion of the predetermined length from a middle of the inverse Fourier transformation results.

12. A frequency-domain-equalization apparatus for a receiver in single-carrier communication, comprising:
- a first section unit that selects continuously a time-sequence signal portion that is longer than one block from a received signal;
- a Fourier-transformation unit that performs Fourier transformation of that time-sequence signal portion that is longer than one block and converts it to frequency-domain signals;
- a channel-compensation unit that estimates channels in the frequency domain and performs channel compensation of the frequency-domain signals;
- an inverse-Fourier-transformation unit that performs inverse Fourier transformation of the channel-compensated signals and generates a time-sequence signal portion that is longer than one block; and
- a second selection unit that selects a one-block time-sequence signal portion from a middle of the inverse Fourier transformation results, wherein said first selection unit comprises a S/P conversion unit that selects from the received signal the time-sequence signal portion that is P times the length N of the signal portion of one block (P is an integer 2 or greater) and inputs this portion in parallel to said Fourier-transformation unit of P·N points.

13. The frequency-domain-equalization apparatus of claim 12 wherein when guard intervals are included in said received signal,
- said S/P conversion unit select said-time-sequence signal portion consisted of P·N number of continuous time-sequence signals without removing the guard intervals, and inputs them in parallel to said Fourier-transformation unit, and
- the inverse-Fourier-transformation unit selects a one-block time-sequence signal portion that does not include guard intervals from the inverse-Fourier transformation results.

14. The frequency-domain-equalization apparatus of claim 11 wherein
- said computation unit outputs the one-block time-sequence signal portions for which said inverse-Fourier transformation has been performed, by executing computation of an equation that converts P·N dimensions in the frequency domain to N dimensions in the time domain.

15. The frequency-domain-equalization apparatus of claim 12 wherein said channel-compensation unit comprises:
- a channel-estimation unit that performs Fourier transformation of N number of continuous time-sequence data, and estimates N number of channels in the frequency domain;
- an estimated-value-interpolation unit that interpolates (P-1) number of estimated channel values between each adjacent estimated channel values, and acquires P·N number of estimated channel values in the frequency domain;
- a channel-compensation-coefficient-calculation unit that calculates channel-compensation coefficients from the estimated channel values; and
- a multiplication unit that multiplies the Fourier-transformation results from said P·N-point Fourier-transformation unit by said respective channel-compensation coefficients to perform channel compensation in the frequency domain.

* * * * *